Feb. 5, 1952
O. B. SUMMERS
2,584,513
SEALING DEVICE FOR SHAFTS
Filed April 19, 1945
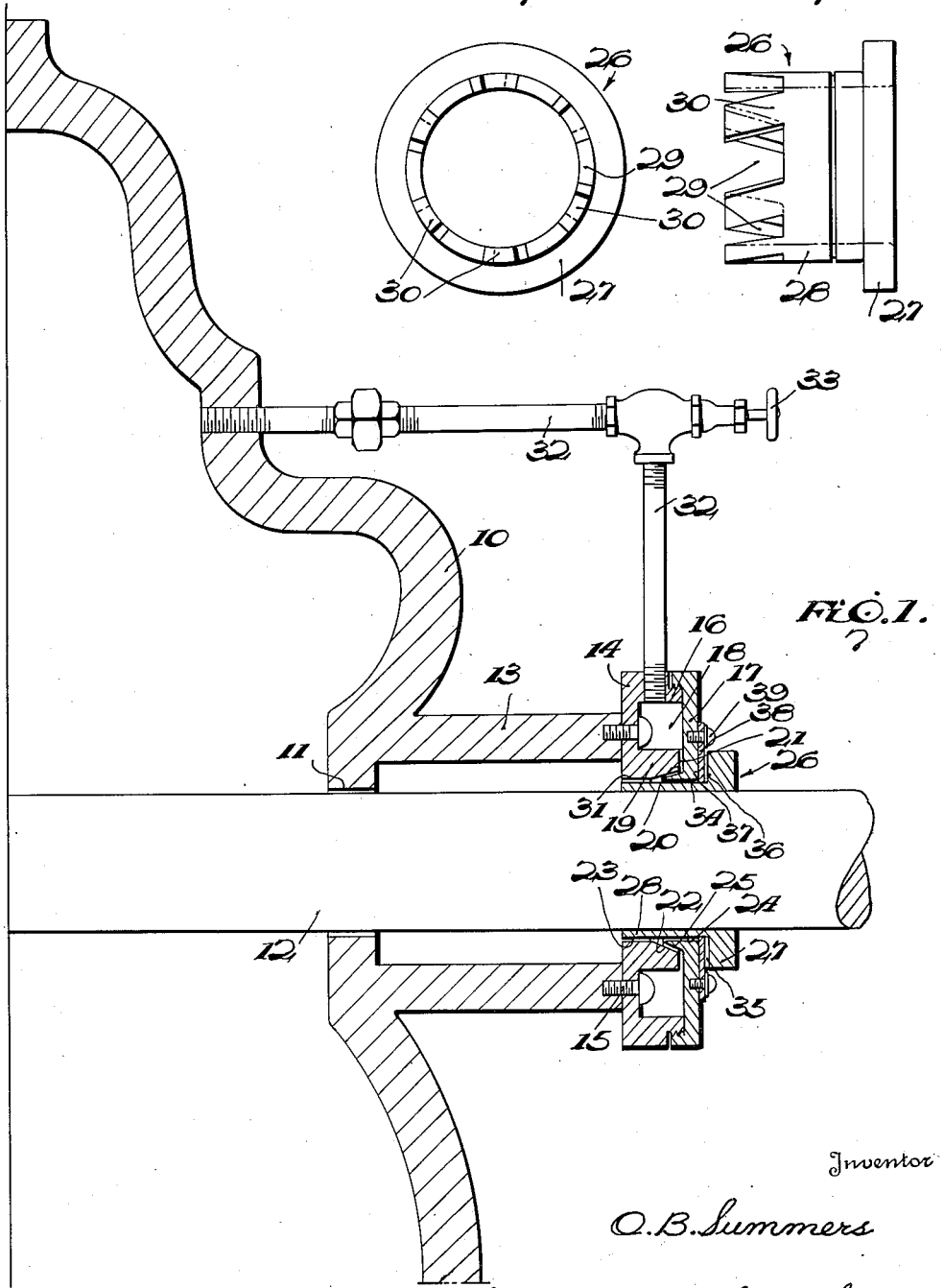
Inventor
O. B. Summers
By Cameron, Kerkam + Sutton
Attorneys Patented Feb. 5, 1952

2,584,513

UNITED STATES PATENT OFFICE 2,584,513

SEALING DEVICE FOR SHAFTS

Orran B. Summers, Phoenix, Ariz., assignor to Jet Shaft Seals, Inc., Phoenix, Ariz., a corporation of Arizona Application April 19, 1945, Serial No. 589,126

5 Claims. (Cl. 286—9)

1

This invention relates to shaft seals, and more particularly to sealing devices for the shafts of pumps and the like, but as will be apparent to those skilled in the art the invention is of wider utility and may be applied to seal the clearance between a rotatable shaft and the contiguous wall of a casing in a wide variety of devices wherein the fluid involved may be a vapor or a gas as well as a liquid. In certain respects that will hereinafter become clear the present invention includes an improvement on the shaft seal disclosed and claimed in my application Serial No. 533,021, filed April 27, 1944, for Sealing Devices for Shafts, now Patent No. 2,494,971, June 17, 1950, and use of such improvement with jet seals of the type there disclosed is contemplated.

It is an object of this invention to provide an improved seal, operating upon the principles explained in my aforesaid application, that is simple in construction, positive in action and highly efficient in service.

Another object of this invention is to provide a shaft sealing device with improved means for preventing escape of fluid from said device when the shaft is at rest.

Another object of this invention is to provide a device of the type last characterized wherein the means for sealing against the escape of fluid when the shaft is at rest does not involve relatively movable parts that may corrode, become clogged by foreign matter or otherwise stick when in operation.

Another object of this invention is to provide a simple sealing device of the type first characterized which may be readily adapted for effective sealing action whether the liquid in question be of high or low viscosity, and which also is available for use with vapors and gases as well as liquids.

Other objects will appear as the description of the invention proceeds.

The invention is capable of receiving a variety of mechanical expressions one of which is illustrated on the accompanying drawings, but it is to be expressly understood that the drawings are for purposes of illustration only and are not to be construed as a definition of the limits of the invention, reference being had to the appended claims for that purpose.

Referring to the drawings in detail wherein the same reference characters are used to designate corresponding parts in the several figures:

Fig. 1 is an axial section through an embodiment of the present invention; and

Figs. 2 and 3 are end and elevational views of one form of sleeve which may be used in embodying the present invention.

In the form shown in Fig. 1, 10 designates the casing of any suitable machine from which casing the escape or leakage of any suitable fluid is to be prevented at the clearance 11 between the shaft 12 and a contiguous wall of said casing. As shown, the shaft opening has associated therewith a cylindrical extension 13 such as commonly provided for receiving a stuffing box. The present invention provides a sealing device that may be mounted on the end of said stuffing box member 13 without alteration thereof and one that avoids the waste of power due to friction, wear or grooving of the shaft, etc., that are characteristic of constructions wherein the seal is effected by forcing sealing material into rubbing engagement with the periphery of the shaft under such pressure as to satisfactorily prevent leakage of fluid lengthwise of the shaft.

In the form shown the improved seal of the present invention comprises an annular housing 14 which may be made in halves suitably attached together if preferred so that it may be assembled around a shaft in position, or it may be made in one piece so that it may be moved into position lengthwise of the shaft. Housing 14 and extension 13 together are sometimes denominated as the seal housing. Housing 14 may be attached to the member 13 in any suitable way as by a plurality of screws 15. Housing 14 is provided with an axially extending peripherally threaded flange 16 on which is threaded and therefore adjustably mounted a flanged plate 17 which completes the housing 14 and provides an annular chamber 18 interiorly thereof. The radially inner wall of said chamber 18 is composed of an axially extending wall 19 whose end surface 20 makes a small clearance 21 with the inner face of the plate 17. The inner face of wall 19 has a beveled surface 22 leading to a cylindrical surface 23 which surrounds and is spaced from the shaft. The radially inner extremity of the plate 17 is provided with an axially extending tapered flange 24 which underlies the tapered surface 22 so that the two tapered surfaces extend in substantial parallelism and provide a clearance 25 which is a continuation of the clearance 21.

Tightly mounted on the shaft 12 so as to prevent escape of fluid between its inner surface and the periphery of the shaft is a sleeve 26 rotating with the shaft and having a radially extending flange 27 and an axially extending generally cylindrical portion 28 which is formed or secured thereon and projects into and preferably extends the full length of the space between the inner surfaces of the wall 19 and flange 24 and the periphery of the shaft. This cylindrical portion 26 of said sleeve may be solid throughout its length and have a cylindrical external surface throughout, or it may be formed with grooves, fins or otherwise surfaced to increase impelling action, or it may be formed as shown in detail in Figs. 2 and 3 wherein its axially inner end is cut away at intervals 29 so as to provide spaced inclined impeller vanes 30 of any suitable number and spacing. The inner end of the cylindrical portion 28 or said vanes 30 are slightly spaced from the cylindrical surface 23 on the flange 19 so as to provide a small clearance 31 that is a continuation of the aforesaid clearances 21 and 25.

The annular chamber 18 is designed to be supplied with fluid under pressure from the inside of the casing 10 and to this end suitable piping 32, which may be provided with a hand valve 33, communicates with said chamber 18 at one end and with any suitable part of the casing 10 from which fluid under suitable pressure may be removed to obtain the sealing action hereinafter explained.

In order to provide means which will prevent escape of fluid when the shaft is stationary so that the sealing means is not in operation, at which time fluid from the clearance at 11 might otherwise flow through the clearance 31 to the clearance 34 between the inner surface of the flange 24 and the outer surface of the cylindrical portion 28 of the sleeve, and thence to and through the clearance between the inner surface 36 of flange 27 and the outer surface 37 of plate 17, means are provided which will operate automatically when the shaft stops to close one of said clearances, preferably that at 35. In order that said means shall not become inoperative through corrosion or sticking of relatively movable parts, said sealing means preferably takes the form of an annular diaphragm 38, of any suitable flexible and sufficiently pliable material such as rubber, which is attached in any suitable way, as by screws 39 to the outer face 37 of the plate 17 and which extends radially inwardly into the clearance 35 almost if not quite into contact with the cylindrical portion 28 of the sleeve 26 where it will be engaged by any fluid seeking to escape through the clearance 34 and be pressed against the inner face 36 of the flange 27 to effect a sealing engagement therewith.

In operation, when the shaft with its sleeve 26 mounted thereon is in rotation, the impeller constituted by the inner cylindrical portion 28 of said sleeve, whether provided with vanes as in Figs. 2 and 3 or provided with grooves, fins or otherwise suitably surfaced as in Fig. 1, withdraws fluid under the pressure existing within the casing 10 through the piping 32, chamber 18 and outlet clearances 21 and 25, the latter of which is inclined in the direction in which a jet is to be formed, and imparts thereto a flow lengthwise of the shaft toward the clearance 11 under a pressure which is higher than that existing within the casing 10 adjacent said clearance 11 because of the kinetic energy imparted to the jet, whereby escape of fluid from the interior to the exterior of said clearance 11 is prevented. As long as said impelling means is in operation it induces a slight suction in the clearance spaces 34 and 35, maintaining said clearance spaces filled with air and holding the diaphragm 38 against the surface 37 on the plate 17. As soon as the shaft stops rotating, however, so that said impelling means is no longer inducing the aforesaid flow, said suction ceases, and the pressure in clearance space 34, corresponding to or approximating the pressure in said casing 10, now exceeds the pressure in said clearance space 35, whereby said excess pressure acting on the diaphragm 38 forces it against the inner surface 36 on the flange 27, automatically sealing the clearance space 35 and preventing leakage of fluid therethrough to the exterior of the sealing device. Thereby leakage is at all times prevented, the jet established and maintained by the impelling means while the shaft is in rotation maintaining a pressure exteriorly of the clearance 11 in excess of that interiorly of said clearance so that outward flow of fluid through said clearance is prevented, while when the impelling means ceases to maintain said jet upon the shaft stopping the excess interior pressure at once automatically seals the clearance space between the relatively rotatable surfaces on the sleeve and housing so as to prevent leakage at this point.

It will therefore be perceived that by the present invention a simple, positive and highly efficient sealing device has been provided which avoids the use of material pressed more or less tightly against the surface of the shaft with consequent frictional losses, wearing or grooving of the shaft, etc., and thereby embodying the principles more fully explained in my aforesaid application Serial No. 533,021. The present invention also provides improved and simplified means for automatically preventing escape of fluid from the sealing device when the shaft stops. While said provision for preventing escape of fluid when the shaft has stopped has been illustrated and described only in conjunction with the jet sealing means of the present invention, it is to be expressly understood that the same may be used with jet sealing means of the construction disclosed in my aforesaid application in place of the expansible and contractible means there disclosed for performing a like function, and has the advantage thereover that it is not composed of relatively movable parts that may corrode or otherwise stick when in service.

While the invention has been illustrated as using a sealing fluid taken from the casing providing the clearance with the shaft which is to be sealed, and such is the preferred practice, it is to be expressly understood that if desired the sealing fluid may be derived from any other suitable source whether it be the same as or different from the fluid in said casing.

It will further be perceived that the simplified impelling means of the present invention readily lends itself to adaptation to the character of fluid with which the invention is to be used. When a liquid of heavy viscosity is involved the impeller may be vaned to properly obtain the desired jet action. With lighter fluids grooves or fins are sufficient to provide the desired jet action, and even a plain cylindrical surface on the impelling means may be sufficient to give adequate jet action with the lightest fluids. As the jet action is set up wholly in a direction axially of the shaft there is no loss of energy arising from radial components of force as when the impeller acts to set up a jet at an angle to the axis of the shaft, and less fluid is required to obtain the desired sealing action. While the invention is particularly useful in sealing pumps and other machines handling liquids, the invention is also applicable to the sealing of clearances where the escape of vapors or gases is to be prevented.

While the embodiment of the invention illustrated on the drawing has been described with considerable particularity it is to be expressly understood that the invention is not restricted thereto as the same is capable of receiving a variety of mechanical expressions, some of which will now readily suggest themselves to those skilled in the art, while changes may be made in the details of construction, arrangement, proportion, etc., of parts without departing from the spirit of this invention. Reference is therefore to be had to the appended claims for a definition thereof.

What is claimed is:

1. In a seal for preventing a leakage flow of fluid from a fluid chamber between a rotor and the fluid chamber housing, said rotor and housing being relatively rotatable and spaced from each other, the combination of a seal housing secured in fluid tight fashion to said fluid chamber housing and extending axially outwardly therefrom along the rotor providing with said rotor the walls of a seal chamber having a communicating opening with said fluid chamber and a terminal opening at its outer end, said openings encircling said rotor, said seal housing being spaced from the rotor at all zones longitudinally of the rotor to provide in said seal chamber a first clearance passage between said openings, said first passage including as a part thereof a relatively restricted portion encircling said rotor and directed at least at its inner end substantially axially of the rotor, and said seal housing being also formed to provide an annular relatively restricted inwardly directed second passage forming a junction with said restricted portion at an acute angle thereto, said acute angle junction being pointed axially inwardly along the rotor, means for supplying fluid to said restricted second passage, and means for maintaining a continuous flow of fluid through said restricted second passage and the portion of said first passage between said junction and said communicating opening to and through said communicating opening, said seal housing including an adjustable member providing one wall of at least a portion of the restricted portion of the first passage and one wall of the second passage.

2. In a seal for preventing a leakage flow of fluid from a fluid chamber between a rotor and the fluid chamber housing, said rotor and housing being relatively rotatable and spaced from each other, the combination of a housing immediately adjacent the chamber housing and annularly spaced from the rotor throughout its length and having a communicating opening with the chamber housing, an annular member secured in fluid tight fashion to said second named housing and providing at least the axially inner wall of an annular chamber encircling the rotor and having a conical bore surface of inwardly decreasing diameter at an acute angle to and spaced from the rotor, a closure plate for the outer end of said annular chamber axially adjustably secured to said member and providing the remaining closing walls of said annular chamber and having an annular axially inward extension projecting within said bore surface and substantially parallel thereto, providing a frusto-conical restricted fluid passage from said annular chamber, and means for introducing fluid into said annular chamber, the bore surfaces of said member and closure plate being annularly spaced from said rotor to provide a clearance therefrom.

3. In a seal for preventing a leakage flow of fluid from a fluid chamber between a rotor and the fluid chamber housing, said rotor and housing being relatively rotatable and spaced from each other, the combination of a housing immediately adjacent the chamber housing and annularly spaced from the rotor throughout its length and having a communicating opening with the chamber housing, an annular member secured in fluid tight fashion to said second named housing and providing at least the axially inner wall of an annular chamber encircling the shaft and having a conical bore surface of inwardly decreasing diameter at an acute angle to and spaced from the rotor, a closure plate for the outer end of said annular chamber axially adjustably secured to said member and providing the remaining closing walls of said annular chamber and having an annular axially inward extension projecting within said bore surface and substantially parallel thereto, providing a frusto-conical restricted first fluid passage from said annular chamber, means for introducing fluid into said annular chamber, the bore surfaces of said member and closure plate being annularly spaced from said rotor to provide a clearance therefrom, and a collar secured to said rotor having a circumferential surface within and spaced from the surface of said closure plate to provide a second restricted fluid passage extending outwardly to an annular terminal opening into the ambient atmosphere, said opening being bounded by said collar and closure plate and said second passage extending inwardly to the chamber in said second named housing.

4. In a seal for preventing a leakage flow of fluid from a fluid chamber between a rotor and the fluid chamber housing, said rotor and housing being relatively rotatable and spaced from each other, the combination of a housing immediately adjacent the chamber housing and annularly spaced from the rotor throughout its length and having a communicating opening with the chamber housing, an annular member secured in fluid tight fashion to said second named housing and providing at least the axially inner wall of an annular chamber encircling the rotor and having a conical bore surface of inwardly decreasing diameter at an acute angle to and spaced from the rotor, a closure plate for the outer end of said annular chamber axially adjustably secured to said member and providing the remaining closing walls of said annular chamber and having an annular axially inward extension projecting within said bore surface and substantially parallel thereto, providing a frusto-conical restricted first fluid passage from said annular chamber, means for introducing fluid into said annular chamber, the bore surfaces of said member and closure plate being annularly spaced from said rotor to provide a clearance therefrom, a collar secured to said rotor having a circumferential surface within and spaced from the surface of the closure plate to provide a second restricted fluid passage extending outwardly to an annular terminal opening into the ambient atmosphere, said opening being bounded by said collar and closure plate and said second passage extending inwardly to the chamber in said second named housing, and an inwardly acting impeller secured to said rotor inwardly of and immediately proximate to said restricted passages.

5. In a seal for preventing a leakage flow of fluid from a fluid chamber between a rotor and the fluid chamber housing, said rotor and housing being relatively rotatable and spaced from each other, the combination of a housing immediately adjacent the chamber housing and annularly spaced from the rotor throughout its length and having a communicating opening with the chamber housing, an annular member secured in fluid tight fashion to said second named housing and providing at least the axially inner wall of an annular chamber encircling the rotor and having a conical bore surface of inwardly decreasing diameter at an acute angle to and spaced from the rotor, a closure plate for the outer end of said annular chamber axially adjustably secured to said member and providing the remaining closing walls of said annular chamber and having an annular axially inward extension projecting within said bore surface and substantially parallel thereto, providing a frusto-conical restricted fluid passage from said annular chamber, means for introducing fluid into said annular chamber, the bore surfaces of said member and closure plate being annularly spaced from said rotor to provide a clearance therefrom, a collar secured to said shaft having a circumferential surface within and spaced from the surface of the closure plate to provide a second restricted fluid passage extending outwardly to an annular terminal opening into the ambient atmosphere, said opening being bounded by said collar and closure plate and said second passage extending inwardly to the chamber in said second named housing, and a normally effective closure for said terminal opening carried by at least one of the bounding members and constructed and mounted to automatically open when subjected to an inwardly acting fluid pressure.

ORRAN B. SUMMERS.

REFERENCES CITED

The following references are of record in the file of this patent:

UNITED STATES PATENTS

| Number | Name | Date |
|---|---|---|
| 1,004,822 | Scheurmann | Oct. 3, 1911 |
| 1,273,648 | Macheunis | July 23, 1918 |
| 1,346,926 | Wilfley | July 20, 1920 |
| 2,187,084 | Kingsbury | Jan. 16, 1940 |
| 2,195,496 | Reed | Apr. 2, 1940 |
| 2,350,448 | Collins | June 6, 1944 |
| 2,494,971 | Summers | Jan. 17, 1950 |

FOREIGN PATENTS

| Number | Country | Date |
|---|---|---|
| 285,680 | Germany | of 1913 |
| 355,439 | Great Britain | of 1931 |